United States Patent [19]
Feldt

[11] Patent Number: 5,391,108
[45] Date of Patent: Feb. 21, 1995

[54] METHOD AND APPARATUS FOR PACKAGING OF SHIRRED FOOD CASINGS AND RESULTING ARTICLE

[75] Inventor: Raymond A. Feldt, Hickory Hills, Ill.
[73] Assignee: Viskase Corporation, Chicago, Ill.
[21] Appl. No.: 219,564
[22] Filed: Mar. 29, 1994
[51] Int. Cl.⁶ .................. B65D 85/20; A22C 13/00
[52] U.S. Cl. ........................ 452/21; 53/444; 53/463; 206/443; 206/802
[58] Field of Search ............. 452/21, 35; 53/427, 53/432, 433, 434, 479, 441, 444, 447, 461, 463, 466, 467; 206/802, 443, 427, 499

[56] References Cited

U.S. PATENT DOCUMENTS

| | | |
|---|---|---|
| 3,218,764 | 11/1965 | Deeren et al. |
| 3,764,351 | 10/1973 | Whittington et al. ......... 206/46 |
| 3,971,187 | 7/1976 | McNeill et al. ................ 53/427 |
| 4,211,054 | 7/1980 | Sramek ........................... 53/236 |
| 5,046,295 | 10/1991 | Knecht ............................ 53/234 |
| 5,092,107 | 3/1992 | Lamm ............................. 53/444 |
| 5,137,153 | 8/1992 | Hendriks ....................... 206/443 |
| 5,228,572 | 7/1993 | Hendriks ....................... 206/443 |

FOREIGN PATENT DOCUMENTS

| | | |
|---|---|---|
| 1056319 | 6/1979 | Canada. |
| 2807906A1 | 8/1979 | Germany. |
| 296671 | 12/1990 | Japan ............................. 53/444 |

Primary Examiner—Willis Little
Attorney, Agent, or Firm—Roger Aceto

[57] ABSTRACT

The bundling together of shirred food casing sticks is accomplished by loosely supporting the sticks in a desired stack configuration, drawing a stretch film from below the stack, folding the film over the top of the stack and taping the film to itself, and then pulling the film downwardly to tighten it about the stack and heat sealing across the bottom of the stack.

21 Claims, 7 Drawing Sheets

METHOD AND APPARATUS FOR PACKAGING OF SHIRRED FOOD CASINGS AND RESULTING ARTICLE

TECHNICAL FIELD

The present invention relates to a method for forming a package comprising a bundle of shirred strands of food casings tightly wrapped in a plastic film. More particularly, the present invention relates to packaging method and apparatus wherein continuous sheets of plastic film or tubular plastic film is utilized in the packaging operation.

BACKGROUND OF THE INVENTION

Small diameter sausages such as frankfurters or the like usually are made using food casings of cellulose. Cellulose food casings or the like customarily are manufactured in long continuous tubular lengths. For handling convenience, these long tubular lengths are gathered into pleats by shirring and are longitudinally compressed by known techniques to obtain a shorter, relatively rigid tubular element known in the industry as a shirred casing stick. The coherency of a shirred stick is derived in part from the shirring operation which forms the casing into generally conical pleats which nest one within another.

During a stuffing operation the stick is loaded onto a stuffing horn and a food emulsion is fed through the horn and into casing which is drawn forward from the stick by the stuffing pressure. It is not uncommon for a shirred stick 50 cm long to contain upwards of 50 meters or more of casing so a large number of individual frankfurters are made with each stick.

Packaging and shipping of shirred sticks present several problems particularly for the type of casing used for frankfurters which generally have a wall thickness of only about 0.025 to about 0.05 mm.

For example, shirred sticks of this casing are relatively fragile in that the nested pleats of casing formed by the shirring operation are easily separated or pulled apart. If the pleats separate, the stick is said to break or lose "coherency". The result is one or more rigid shirred sections connected by loose unshirred sections. Sticks in this condition are not easily loaded onto a stuffing horn and are not at all suitable for automatic stuffing operations wherein the stick is loaded onto a stuffing horn by mechanical means. Accordingly, the packaging for the shirred sticks must be able to minimize stick breakage.

Shirred sticks also are susceptible to damage if made wet. Since stuffing machines frequently are hosed down with water after a stuffing operation, any sticks in the area must be retained in packaging which provides a barrier to water spray and is not itself damaged by water contact.

In commercial practice it generally is customary to package sticks in tight bundles of fifty (50) sticks. Bundling sticks together accomplishes several functions. For example, if the sticks are tight together, there is less likelihood of relative motion between the sticks so the sticks do not rub one against another. Rubbing together of sticks tends to produce undesirable pinhole damage in shirred casing. Also, a tight bundle helps to prevent bowing of individual sticks. Bowing is the result of a number of factors known in the art and is cause for concern because a bowed stick may not load onto a stuffing horn. A tight bundle further tends to reduce the likelihood of stick breakage as long as the bundle remains intact.

Conventional packaging for retaining a stick bundle generally is a carton or box made of corrugated fiberboard (cardboard) or a combination of corrugated fiberboard panels and a stretch or shrink wrap.

Shirred sticks are sold in a number of different diameters and lengths. While packages of fifty sticks are most common, counts of less than fifty sticks are usual for certain sizes of casings. Accordingly, different sizes of cartons and/or carton components must be kept in inventory to provide the appropriate packaging for a given number of each particular size (diameter and length) of stick. The need to obtain and stockpile carton or carton components in a variety of sizes adds to the packaging costs.

Moreover, there currently is a movement to reduce the amount of packaging materials used in order to alleviate the problems associated with collection, storage, disposable and possible recycling of the packaging materials after use. To this end, various alternative packaging arrangements have been proposed which eliminates the corrugated fiberboard components. Such alternatives simply bundle the shirred sticks together in various configurations using a flexible wrapper, stretch film, shrink film or the like. Typical packages of this sort are disclosed for example in U.S. Pat. Nos. 5,137,153; 5,228,572 and in pending U.S. application Ser. No. 08/030,923 filed Mar. 12, 1993 and Ser. No. 08/112,527 filed Aug. 27, 1993.

The use of a stretch or shrink film to bundle shirred strands of food casings reduces the volume of packaging materials and yet provides an inexpensive package which maintains the integrity of a bundle of shirred strands of food casings. Moreover, if the packaging film is in the form of a bag or the like, strands of shirred casing which are removed but unused, can be returned to the package for further storage.

One problem associated with packaging shirred strands of food casing in a stretch or shrink wrap is holding the strands in a stack configuration while wrapping a film around the stack. This drawback can be overcome by using premade bags and then supporting the bag so strands can be loaded into the bag. However, it is preferred for efficient operation to draw the packaging film from a continuous supply such as a roll.

Accordingly, one object of the present invention is to provide a method and apparatus for packaging shirred strands which utilizes a packaging film drawn from a continuous supply.

Another object is to form such a package by stretching a plastic film about a stack of shirred strands to bundle them together.

A further object is to provide a method and apparatus which utilizes a continuous tubular film for packaging a plurality of shirred strands of food casings.

In the method of the present invention, a film such as a heat sealable stretch or shrink film is drawn from a continuous supply. Preferably the film is tubular stock which is laid to its flat width and rolled up. An appropriate length of the film is drawn upwardly from a supply roll and opened. The strands of shirred food casing are stacked into the open tube. The open end of the tube is closed over the top of the stack and then the film is drawn tight and stretched about the stack. The film is clamped to hold it taught about the stack and then is heat sealed across its flat width to form a package which is severed from the film supply.

Drawing the film tight about the stack requires that the tubular film is closed over the top of the stack. This can be accomplished by folding the open end of tube over the top of the stack and applying a tape strip along the stack to hold the overlapped ends together. With this done, the film can be pulled downwardly to tension the film about the stack. Thereafter, the tubular film is heat sealed across its flat width along the bottom of the stack to form a tight bundle and then the bundle is severed from the film supply.

The package also can be formed from single plies of film rather than tube stock. This may be accomplished by drawing a like amount of film up over opposite sides of the stack from each of two film supplies, joining the two films over the top of the stack, pulling them downward to tighten them about the stack and then heat sealing the films together along the bottom of the stack.

Preferably, the film, either a flattened tubular film or two superimposed single sheets, is drawn vertically from the supply and supported so as to provide upstanding sides. The shirred strands then are laid downwardly into the space between these sides before the film is closed over the top of the stack.

As an alternative, film from two separate supplies are heat sealed across their flat width and are drawn upwardly from the supplies and formed to a tunnel shape structure. With this arrangement a stack of shirred strands can be inserted endwise into the tunnel shape. Thereafter, the films can be drawn downwardly to tighten them about the stack and a second heat seal made along the bottom of the stack.

Accordingly, the method of the present invention for packaging a plurality of shirred strands of food casings is characterized in one aspect thereof by the steps of:
  a) arranging a supply of stretchable and a heat sealable film below a horizontal table;
  b) drawing superimposed sheets of said film from said supply and passing them upwardly through an elongated slot in said table until there is a sufficient length of film above the horizontal table to form a desired package;
  c) spreading said sheets to provide a space therebetween with portions of said film being draped along said table;
  d) loading strands of shirred food casings into said space and onto said table to form a stack comprising rows of said strands piled one on another;
  e) closing said sheets over said stack and pulling on said film from below said table to draw film downwardly through said slot and tension said sheets about said stack;
  f) clamping said sheets together across the film width at a location beneath said stack to maintain tension of the sheets about said stack; and
  g) heat sealing said sheets together below said clamping location and thereafter unclamping said sheets and severing said film supply below said heat seal to provide a tightly bundled stack of said shirred food casing strands.

The apparatus of the present invention may be characterized by
  a) a horizontal table including means to receive and support a plurality of strands of shirred food casings arranged in a loose stack;
  b) a film supply disposed below said table and composed of two superimposed sheets of a stretchable and heat sealable film;
  c) said table having an elongated slot to accommodate passage of a length of said film upwardly through said slot for disposing said sheets over opposite sides of said stack;
  d) means below said table for gripping and pulling said film downwardly through said slot to draw said film tight about said stack;
  e) a clamp means closable across the width of said sheets for holding said film tight about said stack; and
  f) a heat sealer below said clamp means for heat sealing said sheets together across the flat width of said film.

DETAILED DESCRIPTION OF THE INVENTION

Figure 1:
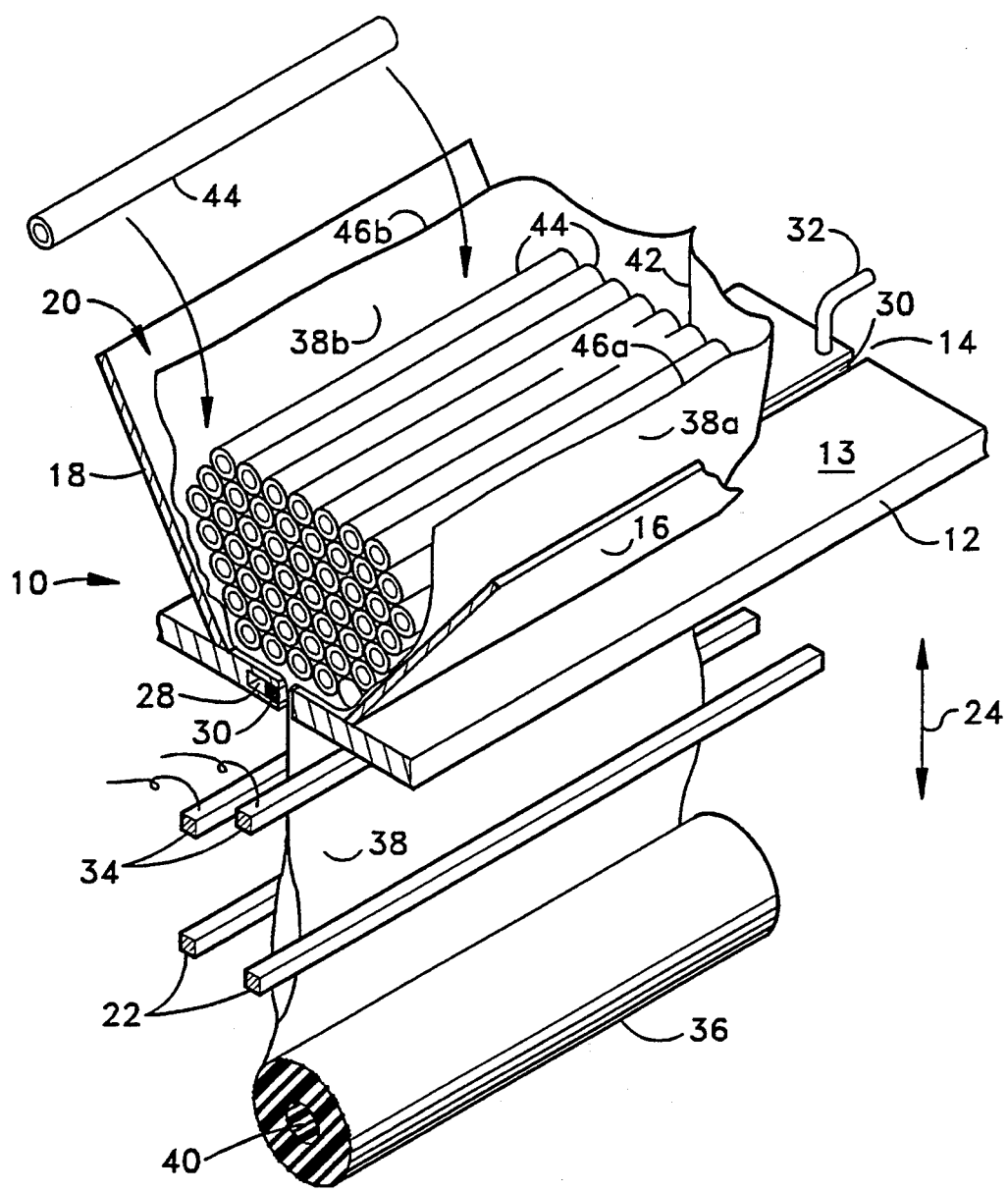
FIGS. 1–5 are schematic perspective views partly broken away and in section illustrating the apparatus of the present invention and showing steps in the packaging method of the present invention.

Referring to the drawings, FIG. 1 shows the packaging apparatus of the present invention generally indicated at 10. It should be appreciated that the apparatus is shown in schematic fashion to facilitate an understanding of the apparatus and the packaging method of the present invention. The apparatus includes a horizontal table or other appropriate support platform 12. This table has an elongated, longitudinally, extending slot 14. Upstanding from the table are walls 16, 18 which form a trough 20 for purposes setout herein below. Preferably, the included angle between the table and walls 16, 18 is about 120°.

Disposed below the level of the table is a set of clamp members 22. These clamp members 22 extend substantially the full length of the table and are supported on a frame (not shown) which is movable vertically in the direction of arrow 24. In addition, the clamp members 22 are movable one towards the other. The frame arrangement and means for moving both the frame and clamp members 22 are not shown since the specific construction of these components is not considered critical.

Above clamp members 22 is a second clamping mechanism which preferably, is incorporated into the table 12 in order to locate it as close as possible to the upper surface 13 of table 12 for purposes set out hereinbelow.

The clamping mechanism includes an elongated seat 28 which is incorporated into table 12 and which opens through the side of slot 14. Slidably disposed in one seat is a clamp member 30 which is schematically illustrated in FIG. 1. The seat is connected through an air line 32 to a supply of pressurized air (not shown). Thus, when the seat is pressurized, the clamp member 30 will be forced towards the other side of slot 14.

Disposed between the two sets of upper and lower clamps 22 and 30 is a heat sealer 34 shown schematically in FIG. 1 as two elongated electrically heated elements. These also are arranged to close one against the other. In a preferred arrangement, the electrically heated elements of the heat sealer 34 are likewise incorporated into the table structure as further described hereinbelow.

Also disposed below the level of the table on any suitable frame support (not shown) is a roll 36 of a stretchable, and heat sealable film 38. The stretch film 38 is a double ply wherein the plies are laid flat one against the other. Preferably the film is tubular stock laid to a flat width and reeled upon a core 40. Thus the two plies comprise the flattened opposite sides 38a, 38b of the tube connected along fold lines 42 (only one of which is shown in FIG. 1).

A stretch film found to be suitable for use in the present invention is a 3 mil polyethylene film as sold by Armin Corporation as its Film No. 7215 C. Such a film is characterized by being heat sealable and having a machine direction elongation of 400% and tensile strength of 4400 psi as measured by ASTM D882.

In operation, tubular film 38, drawn from the supply roll 36, is passed upwardly through the elongated slot 14 and into the trough 20 formed by the upstanding walls 16, 18. The length of film drawn upwardly into the trough and between walls 16, 18 depends upon the size of the package to be made. After the appropriate length of film is pulled up into the trough, the laid flat tube walls 38a, 38b are spread apart to open the tubular film. For purposes of illustration, only a right side portion of the opened tubular film is shown. The left side portion not shown would be a mirror image.

As shown in FIG. 1, the tubular film is sufficiently opened so strands 44 of a shirred food casing can be loaded into the tubular film between the spread-apart walls 38a, 38b. The strands 44 laid into the open film are supported from below by the table 12 and by the upstanding walls 16, 18 and at this point, the film does not provide any support to the stack.

In a preferred stacking arrangement the strands are laid in rows and the rows are piled one on another so the stack is hexagonal in cross section. This stacking arrangement is facilitated by having the walls 16, 18 set at an angle of 120° with respect to the table surface 13. However, the preferred shape is an irregular hexagon in that the number of rows making up a stack is insufficient to form a complete regular hexagon. A preferred shape of a stack containing 50 strands is formed using seven rows. The lowermost row contains five strands; each of the next four rows contain one more stick than the row below and each of the next two rows contains one less stick than the row below. This preferred shape is further described in a copending application Ser. No. 08/209,128, filed Mar. 11, 1994 the disclosure of which is incorporated herein by reference.

As noted above, the desired complement of strands may vary depending upon the diameter and length of the strands but generally, for most sizes of casings, there are fifty strands per bundle.

Figure 2:
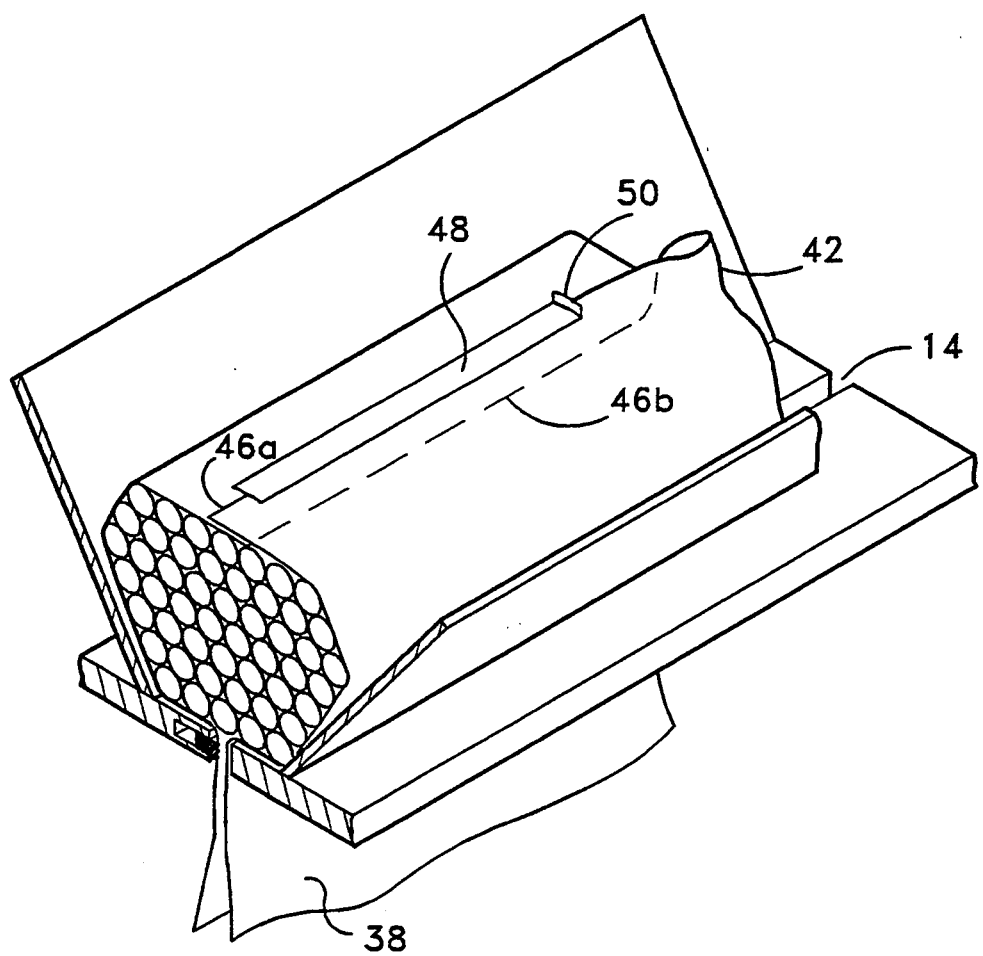

After the desired complement of strands 44 is loaded into the open film, the uppermost ends 46a, 46b of the tubular film 38 are folded down over the top of the stack with one of the ends 46a, b, overlapping the other as shown in FIG. 2.

These ends 46a, b then are attached one to another to close them over the top of the stack. This may be accomplished by laying a strip of an adhesive tape 48 along the overlapped film ends, only a portion of the tape being shown in FIG. 2. For purposes of the present invention a preferred tape is a Parco Corporation No. 503A polyethylene tape. This tape has an acrylic based pressure sensitive adhesive on a 4.5 mil low density polyethylene backing. One end 50 of the tape (or both ends) is folded so as to adhere to itself and is loose from the film 38. This provides a convenient tab for manually gripping and stripping the tape from the film when opening the package.

Figure 3:
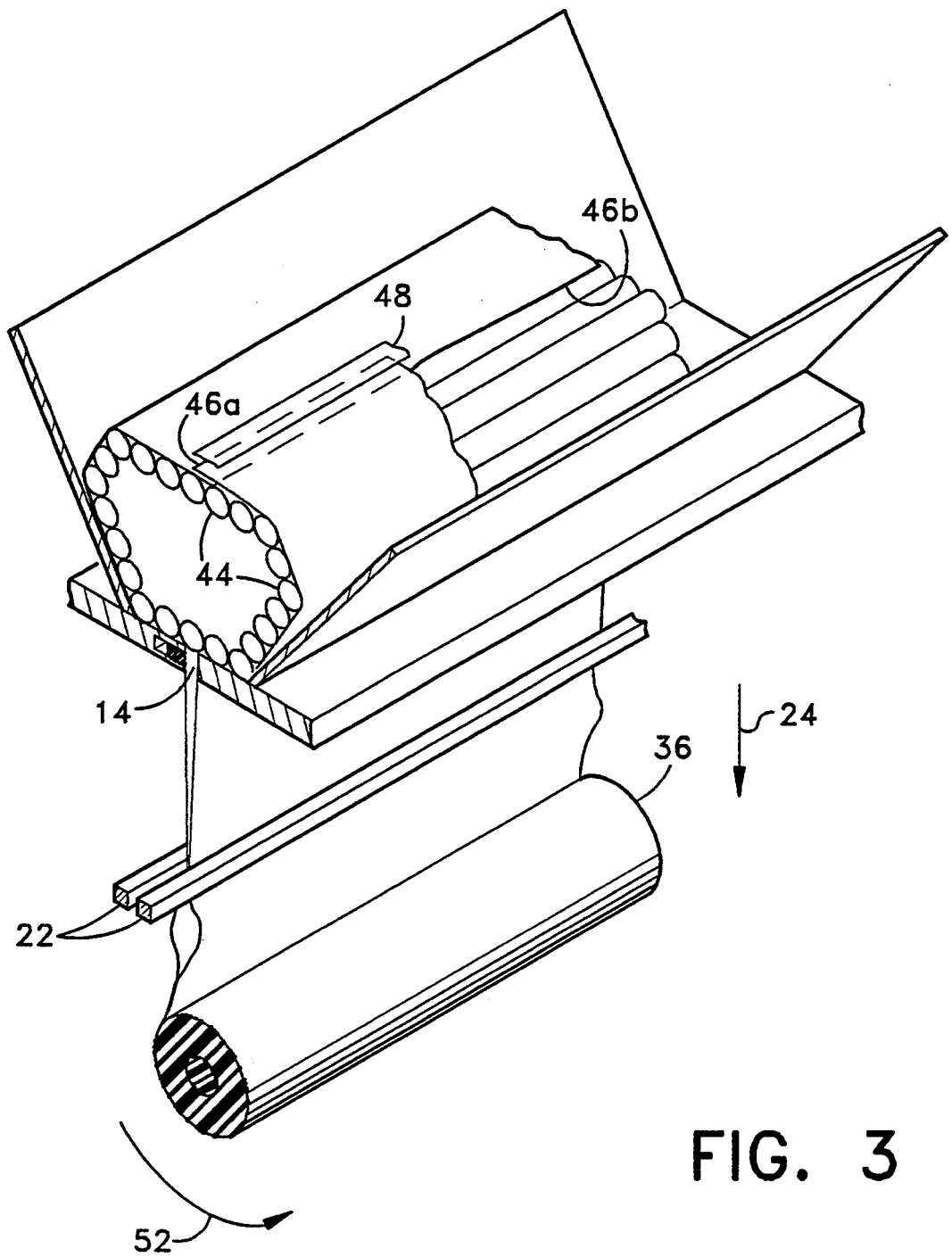

At this point the film still is relatively loose around the stack. To tighten the film about the stack, the film 38 is pulled from below the table 12 to draw film downwardly through slot 14. This can be accomplished, for example, by driving the roll 36 in the direction of arrow 52 (FIG. 3). It is preferred however, to close lower clamp members 22 against the film 38 below the table level and then move these clamp members downwardly in the direction of arrow 24. This pulls the film back through slot 14. Since the opposite ends 46a, 46b of the tubular film are, as described above, attached one to another by adhesive tape 48, pulling the film downwardly through the slot will draw and stretch the film tight about the stack as shown in FIG. 3. This puts the entire length of film between the lower clamp members 22 and the adhesive tape 48 in tension. The inward pressure exerted on the strands 44 by the stretched-taught film bundles the strands tightly together.

Figure 5:
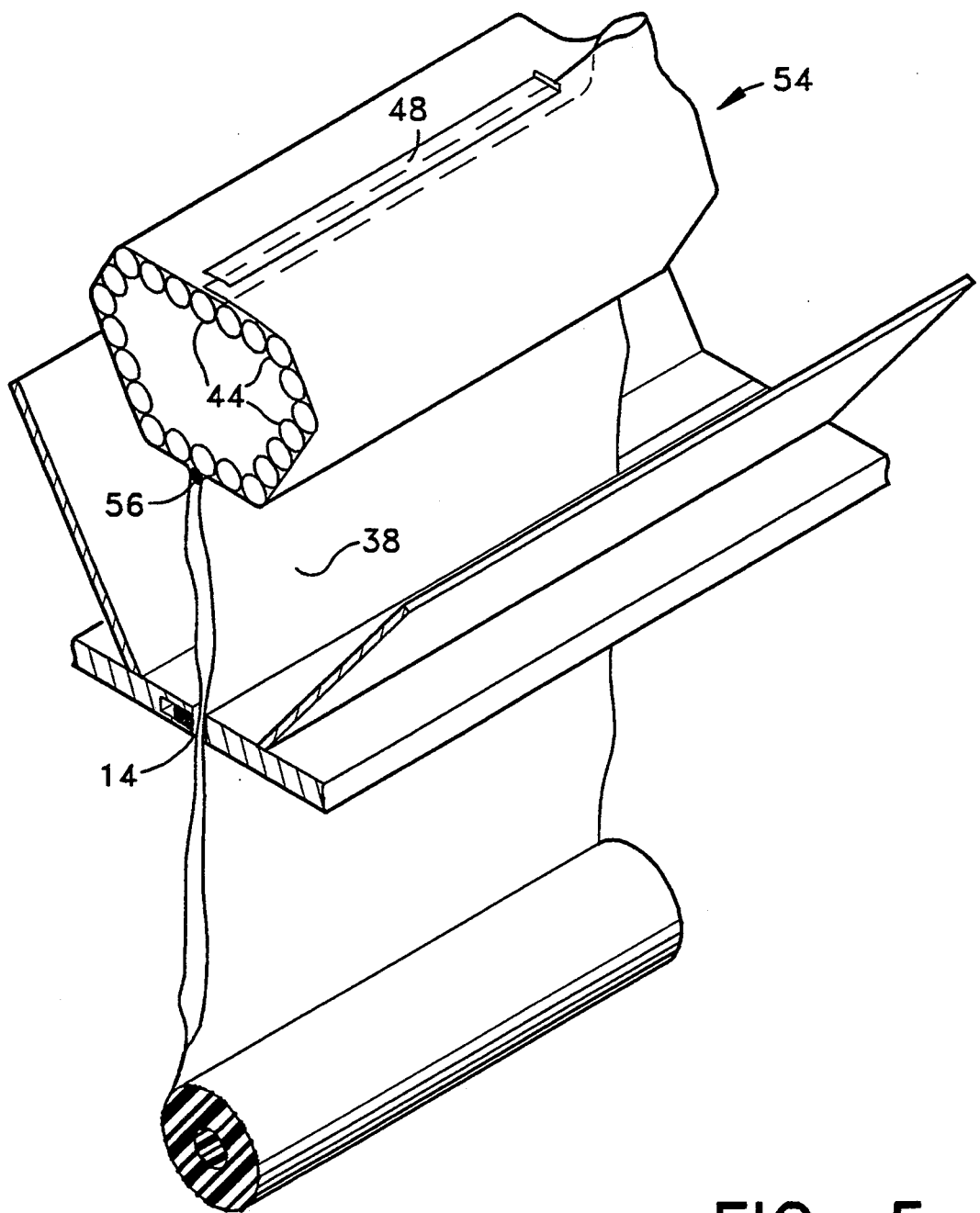

While the film is kept tight about the stack, the film is heat sealed across its flat width at a level below the stack to create a package 54 composed of the bundled together strands (FIG. 5).

Figure 4:
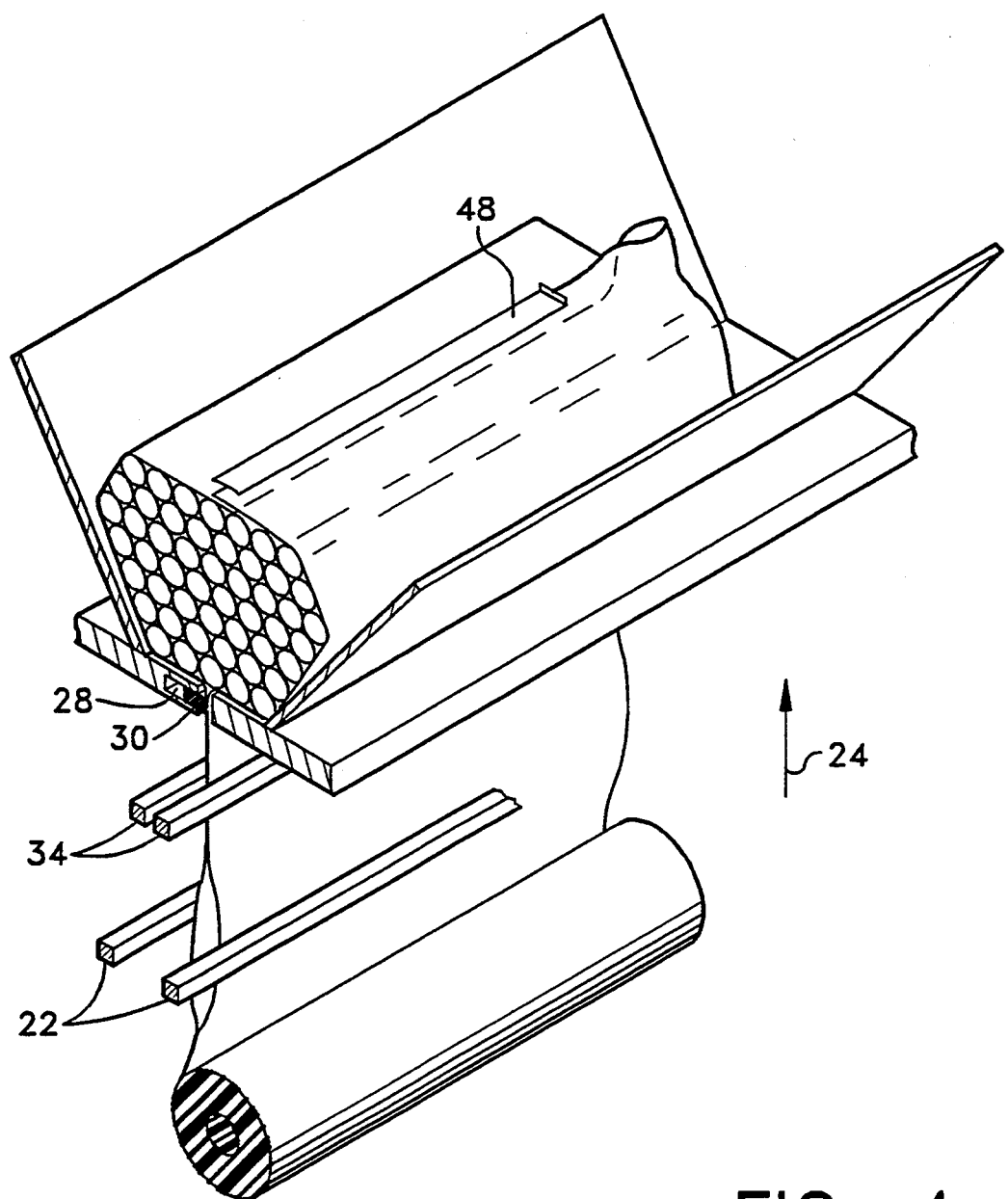

Preferably, the section of film which is engaged by the heat sealer 34 is not under tension during the formation of the seal. Thus, prior to heat sealing a portion of the film is slackened while maintaining tension of the film about the strands. This is accomplished by operating the upper clamp member 30 contained within the table structure. In this respect, pressurized air from air lines 32 (FIG. 1) is introduced into the seat 28 to pressurized the volume of the seat behind clamp member 30. This pressure urges the clamp member 30 from the seat 28 and presses the film against the opposite slot wall as shown in FIG. 4. Thereafter the lower second set of clamp members 22 are opened and moved upwardly in the direction of arrow 24. Opening these clamp members relieves tension only on that portion of the film below the upper clamp member 30. The portion of film between the upper clamp member 30 and the adhesive tape 48 remains under tension and taught around the stack. Now, heat sealer 34 can close against slack film in order to form a heat seal across the tubular film flat width.

Air pressure within the seat 28 is relieved to allow the upper clamp member 30 to open. When the upper clamp member 30 opens, there is of course a short length of film between this member and the heat sealer 34 which is pulled upwardly and causes some slackening of the film around the stack. This slackening will not appreciably decrease the tightness of the bundle if the film is sufficiently stretched about the stack and the heat sealer 34 is close to the upper clamp member 30.

The package or "caddie" 54 of tightly bundled strands 44 then is lifted from the trough (FIG. 5.) The heat sealing operation which forms a heat seal 56 along the bottom of the package does not itself sever the tubular film so lifting the package pulls an additional length of the film 38 up through slot 14. Any suitable means then may be used to sever the film from below the heat seal 56 to separate the package 54 from the film supply. Severing provides an open end to the flattened tubular film for the next packaging operation.

If an adhesive tape 48 is used, it should be appreciated that the structure of the adhesive tape 48 and the nature of the adhesive is important. In this respect, the tape should have a backing which is not so elastic that it allows the overlapped film ends 46a, 46b to separate when tension is applied to tighten the film about the stack. Further, the adhesive itself must be sufficiently aggressive to remain adhered to the film under tension and yet strip from the film for opening the package. One suitable tape for use with the stretchable and heat sealable polyethylene film mentioned above, is a 2 in. (50.8 mm) wide tape sold by Parco Corporation, catalog No. 503A. As noted above, this tape has a 4.5 mil substrate made of low density polyethylene. The adhesive on this backing is an acrylic based pressure sensitive adhesive about one mil thick.

Figure 6:
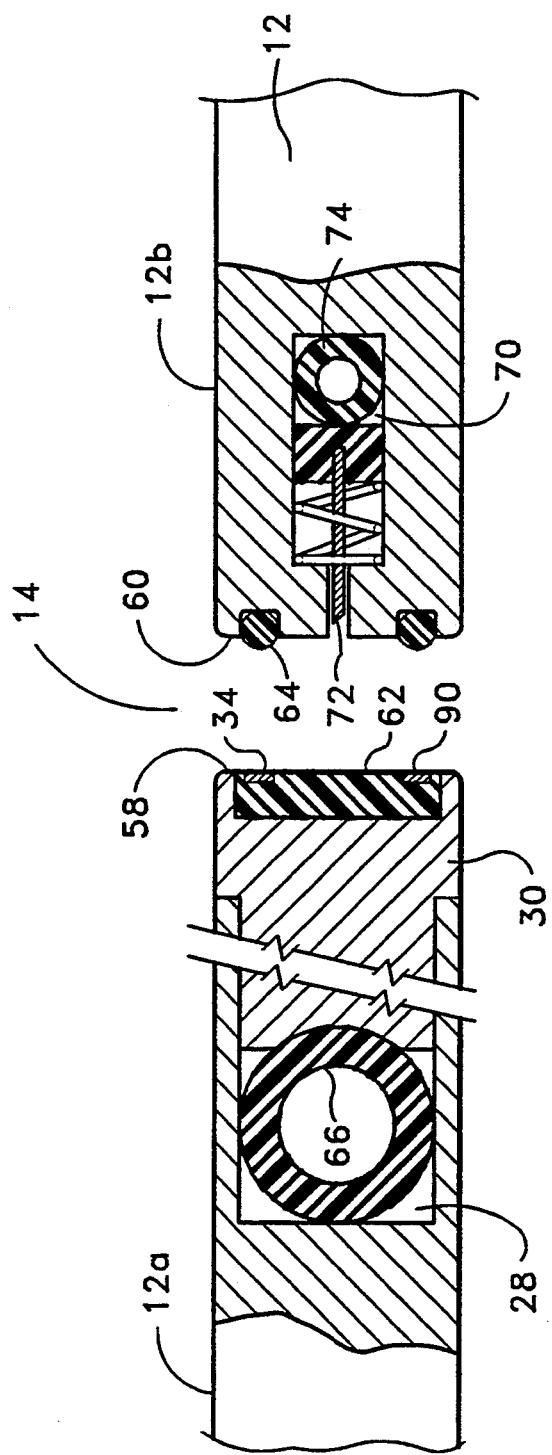
FIG. 6 is a view, partly in section showing a portion of the apparatus of FIG. 1 in greater detail.

FIG. 6 illustrates a preferred embodiment of the apparatus wherein the upper clamp member 30 and heat sealer 34 of FIG. 1 are incorporated into the table structure. It also is possible to incorporate a perforator into the table structure (as described hereinbelow) to facilitate separation of the formed package from the film supply.

FIG. 6 shows a portion of the table 12 including the slot 14 in the table. Portions of the table on either side of the slot are identified at 12a and 12b. Table portion 12a includes longitudinal seat 28 which opens to the slot. Slidably disposed in this seat is clamp member 30. The clamp member includes a surface 58 which is adapted to press against a corresponding surface 60 on table portion 12b in order to clamp the film plies (not shown) extending through the slot.

Fixed to a face of the clamp member 30 is an insulation pad 62. On this pad, just below the clamp surface 58, is an electrically heated heat sealing wire 34. Wire 34 can be any suitable wire conventionally used for impulse heat sealing of plastic films. Opposite this wire, on table portion 12b is an anvil 64 against which the heat sealing wire presses during the heat sealing operation.

Disposed in the seat 28 behind clamp member 30 is an elongated inflatable bladder 66. Inflation of this bladder operates to drive the clamp member 30 to the right as viewed in FIG. 6. This carries the clamp surface 58 against the corresponding surface 60 on table portion 12b. In this fashion, a film (not shown) passing through slot 14 is clamped between the surfaces 58 and 60. At the same time heat seal wire 34 is pressed against the anvil 64. When the wire is energized and is electrically heated, the heat seal 56 (FIG. 5) is formed across the flat width of the film.

As a further embodiment, table portion 12b may be provided with a means to perforate the film. In this respect, the table portion 12b has an elongated seat 70 extending along slot 14. Slidably disposed in this seat is a serrated blade 72. An inflatable bladder 74 in seat 70 is inflated to drive the blade to the left as viewed in FIG. 6. This moves the blade from within the table portion 12b and against the pad 62 and provides a line of perforations (not shown) along the film to facilitate separation of the package 54 shown in FIG. 5 from the supply of film 38.

The method as illustrated in FIGS. 1–5 utilizes tubular film stock. In this respect, FIG. 1 shows the opposite tubular side walls 38a, b joined along a fold line 42 at one end of the package. A similar fold line exists at the opposite end of the package. Accordingly, using tubular film stock forms a package which is closed at its opposite ends. When tape 48 is removed so the overlapping film ends 46a, 46b can be folded back to open the package, a bag-like structure is formed.

Figure 7:
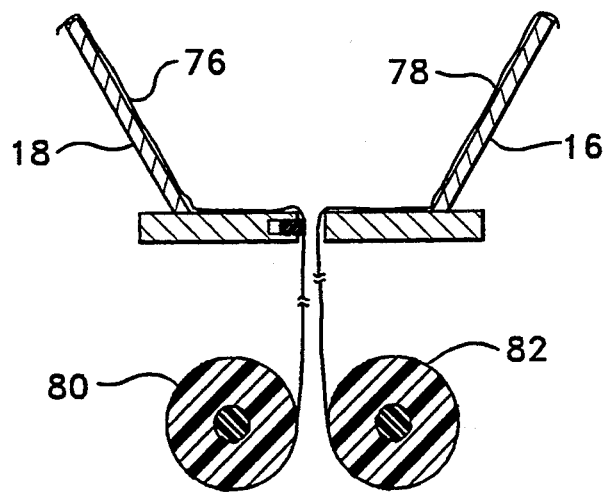
FIGS. 7 and 8 are end views showing in schematic fashion alternative packaging method steps.

It should be appreciated that a package also can be formed using a film stock which is folded and laid flat along a single fold line 42 so the opposite left side portion of the film (not shown in FIG. 1) is open. The package also can be formed using two single plies of film 76, 78 drawn from each of two supplies 80, 82 shown in FIG. 7. Use of either single fold or separate plies of film stock will allow formation of a package using the steps illustrated in FIGS. 1–5 with the added option that the shirred strands 44 can be loaded endwise into the trough 20 instead of over the top of the side walls 16, 18 as described hereinabove with reference to FIG. 1.

Figure 8:
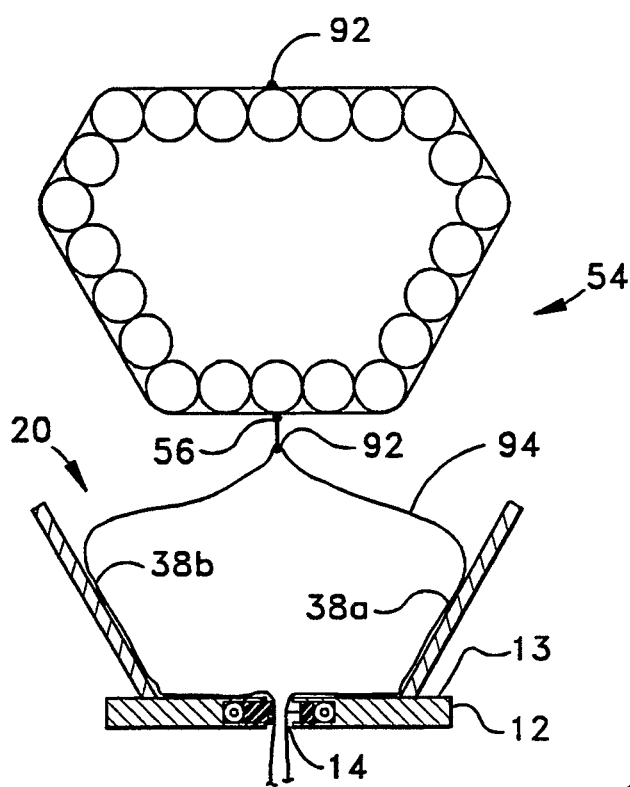

Loading strands endwise into the film provides a further option of replacing the tape 48 with a heat seal. In this respect, FIG. 6 shows the table portion 12a to have a second heat seal wire 90 incorporated into clamp member 30 and spaced below both the heat seal wire 34 and the serrated knife 72. As shown in FIG. 8, the second heat seal wire 90 allows formation of a second heat seal 92 across the flat width of the film just below heat seal 56. This second heat seal 92 becomes a heat seal along the top of a package (and replaces tape 48) while the heat seal 56 remains a heat seal along the bottom of a package.

In particular, after both heat seals are made by the seal wires 34, 90 the completed package 54 is lifted from trough 20. This lifting will pull additional film through slot 14 so that the heat seal 92 joining the film plies is above the surface 13 of table 12.

Figure 9:
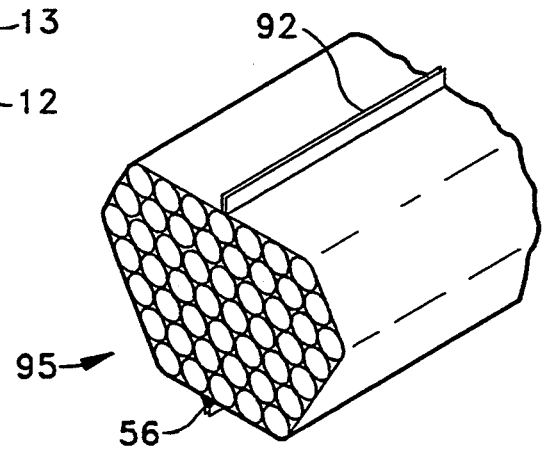
FIG. 9 is a perspective view showing one form of a package formed according to the method of the present invention.

The film plies 38a and 38b below the heat seal 92 now can be spread apart and form an open ended tunnel-like structure 94 which can be loaded endwise with shirred strands. After the endwise loading of the shirred strands into the film, the tightening of the film about a stack of shirred strands proceeds as described hereinabove. The result is packaging as shown in FIG. 9 having at least one open end 95 wherein the tight bundle is maintained by one heat seal 92 extending along the top of the package and another heat seal 56 along the bottom of the package.

Thus it should be appreciated that the present invention provides a method and apparatus which utilizes a plastic film to tightly bundle together a stack of shirred food casing strands. The method utilizes plastic film drawn from a continuous roll which facilitates the packaging operation and eliminates the need for corrugated fiberboard materials for the bundling of the strands.

Having described the invention in detail, what is claimed as new is:

1. A method of forming a package composed of a plurality of shirred strands of food casings tightly bundled together by a stretch film, comprising the steps of:
   a) arranging a supply of a stretchable and a heat sealable film below a horizontal table;
   b) drawing superimposed sheets of said film from said supply and passing them upwardly through an elongated slot in said table until there is a sufficient length of film above the horizontal table to form a desired package;
   c) spreading said sheets to provide a space therebetween with portions of said sheets being draped along said table;

d) loading strands of shirred food casings into said space and onto said table to form a stack comprising rows of said strands piled one on another;

e) closing said sheets over said stack and pulling on said film from below said table to draw film downwardly through said slot and tension said sheets about said stack;

f) clamping said sheets together across the film width at a location beneath said stack to maintain tension of the sheets about said stack; and g) heat sealing said sheets together across the film flat width below said clamping location and thereafter unclamping said sheets and severing said film supply below said heat seal to provide a tightly bundled stack of said shirred food casing strands.

2. A method as in claim 1 wherein said film in said supply is a tubular film laid to its flat width so as to provide two superimposed sheets.

3. A method as in claim 1 where said loading step (d) comprises placing said strands in a trough having said table for its base and the said trough having spaced side walls each upstanding at an angle of 120° from said base.

4. A method as in claim 1 wherein closing said sheets over said stack is accomplished by folding one of said sheets over the other to provide overlapping film portions and attaching said overlapping portions together.

5. A method as in claim 4 wherein attaching said overlapping portions together is accomplished by applying an adhesive tape along said overlapping portions to adhere one to another.

6. A method as in claim 1 wherein pulling on said film from below said table is accomplished by closing a first clamp against said film below the level of said table and then moving said clamp downwardly.

7. A method as in claim 1 wherein said clamping occurs at two vertically spaced locations and said heat sealing occurs between said vertically spaced locations after said pulling at step (e).

8. A method as in claim 7 including unclamping said film only at the lower of said vertically spaced locations and then heat sealing said sheets together across the film flat width and thereafter unclamping said film at the upper of said vertically spaced locations.

9. A method as in claim 1 comprising:

a) closing a first clamp against said sheets at a location below the level of said table;

b) moving said first clamp downwardly to draw film downwardly through said slot and tension said sheets about said stack;

c) closing a second clamp against said sheets at a location above said first clamp and thereafter opening said first clamp to relieve tension on said film below said second clamp; and d) heat sealing said sheets together at a location intermediate said first and second clamps.

10. A method as in claim 1 comprising drawing said superimposed sheets from separate supplies each comprising a single ply of said film.

11. A method as in claim 10 including heat sealing said sheets together so as to provide two vertically spaced heat seals extending across the width of said film wherein the upper of said heat seals is at the bottom of a first of said packages and the lower of said heat seals being at the top of a subsequent one of said packages.

12. A method as in claim 11 including perforating between said heat seals to provide a line of weakness for separating a formed package from said film supply.

13. Apparatus for forming a package composed of a plurality of food casings tightly bundled together by a stretch film, said apparatus comprising:

a) a horizontal table including means to receive and support a plurality of strands of shirred food casings arranged in a loose stack;

b) a film supply disposed below said table and composed of two superimposed sheets of a stretchable and heat sealable film;

c) said table having an elongated slot to accommodate passage of a length of said film upwardly through said slot for disposing said sheets over opposite sides of said stack;

d) means below said table for gripping and pulling said film downwardly through said slot to draw said film tight about said stack;

e) clamp means closable across the width of said sheets for holding said film tight about said stack; and f) a heat sealer below said clamp means for heat sealing said sheets together across the flat width of said film.

14. Apparatus as in claim 13 wherein said means for gripping and pulling said film includes a pair of clamp members which are closable one against another for clamping said film therebetween and said clamp members being movable downwardly after closing against said film.

15. Apparatus as in claim 13 wherein said clamp means is incorporated into said table and includes a clamp member movable across said slot and against said film.

16. Apparatus as in claim 15 wherein said heat sealer is incorporated into said table structure and includes a member movable across said slot and spaced below said clamp means.

17. Apparatus as in claim 13 wherein said table includes a seat which is open to said slot, a clamp member disposed in said seat and drive means operable to move said clamp member in said seat and towards said slot, said clamp member having a surface which cooperates with an opposing surface of said slot to clamp said film therebetween.

18. Apparatus as in claim 17 wherein said drive means is an inflatable bladder disposed between said seat and said clamp member.

19. Apparatus as in claim 17 wherein said heat sealer is an impulse heated wire carried by said clamp member.

20. Apparatus as in claim 19 wherein said clamp member carries a pair of said impulse heated wired, one disposed above the other for effecting two heat seals across the flat width of said film.

21. Apparatus as in claim 13 wherein said table includes a seat which is open to said slot, a perforating means movable in said seat, and drive means operable for moving said perforating means in said seat and towards said slot for effecting a line of perforations across the flat width of said film.

* * * * *